UNITED STATES PATENT OFFICE.

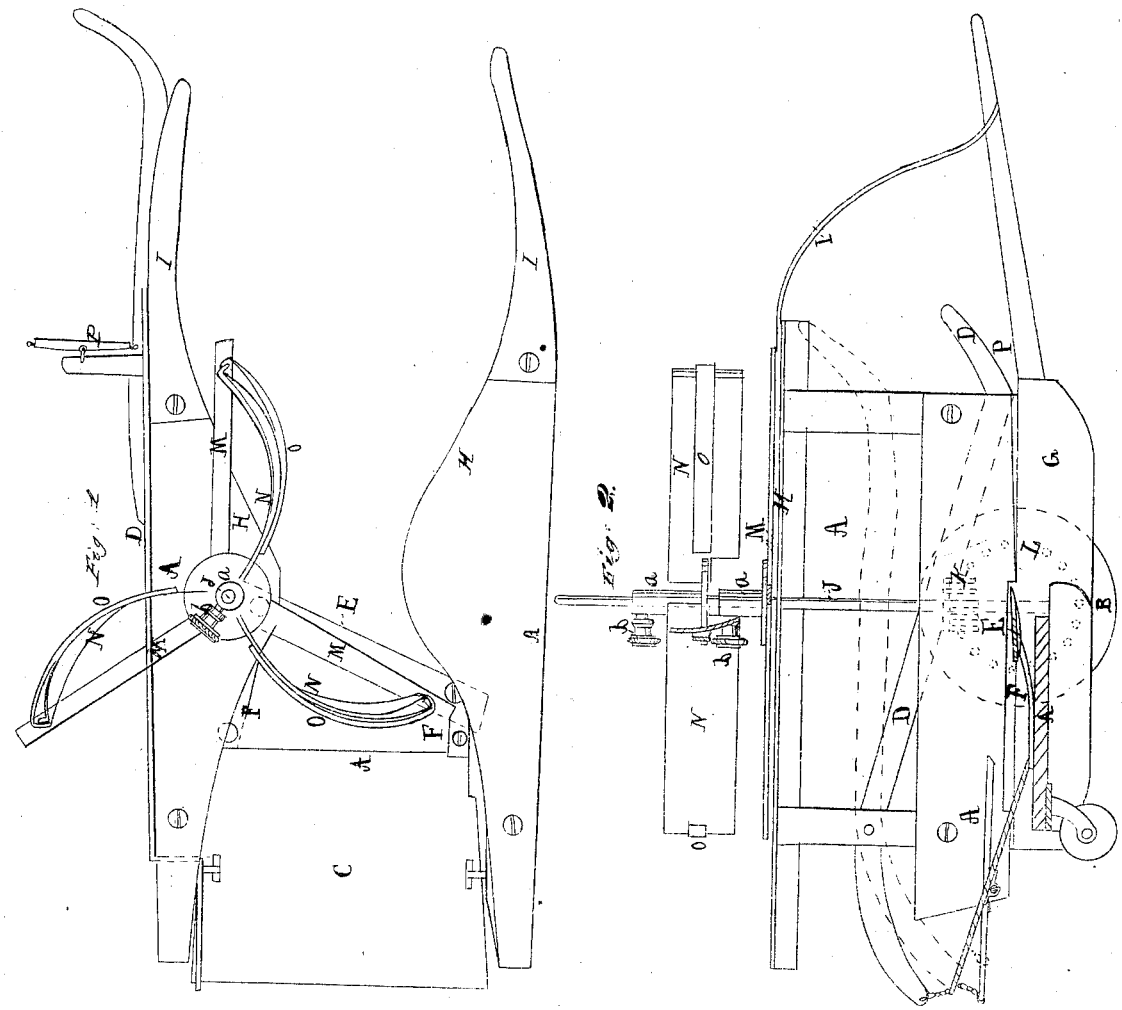

ISAAC REAMER AND HENRY MILLER, OF CONRAD'S STORE, VIRGINIA.

IMPROVEMENT IN CORN-HARVESTERS.

Specification forming part of Letters Patent No. 21,516, dated September 14, 1858.

*To all whom it may concern:*

Be it known that we, ISAAC REAMER and HENRY MILLER, of Conrad's Store, in the county of Rockingham and State of Virginia, have invented a new and useful Improvement in Corn - Harvesters; and we do hereby declare that the following is a full, clear, and exact description of the same, reference being had to the accompanying drawings, forming a part of this specification, in which—

Figure 1 is a plan or top view of a corn-harvester constructed with our improvements. Fig. 2 is a vertical longitudinal section of the same.

Similar letters of reference in each of the several figures indicate corresponding parts.

The nature of our invention consists in arranging the diagonally-set knife on springs, and with its cutting-edge slightly elevated above its rear edge. By thus arranging the knife the cutting action is greatly enhanced, for when the knife comes in contact with the cornstalks it cuts with an upwardly-oblique cut, owing to its being set with its cutting-edge elevated, and the springs allowing it to give in an upward direction. Cutting the corn with an oblique upward cut is very essential, and is always practiced when corn is harvested by hand, on account of the roots of the stalks offering a stronger resistance to cut against than is offered by the upper portion of the stalks in cutting downward.

It also consists in the employment of an auxiliary adjustable reel, in combination with the main reel, when said auxiliary reel has its blades or arms made broad and convex, and with a sufficient spiral twist to draw the cornstalks into the cart as fast as cut down, and each of said arms has a spring arranged on its convex side to facilitate and insure the falling of the stalks onto the platform, as hereinafter described.

To enable others skilled in the art to make use of our invention, we will proceed to describe its construction and operation A represents a cart arranged on two wheels, B.

C is an inclined tilting platform, hinged to the rear end of the cart. D is a foot-lever for tilting the same, as illustrated in red.

E is the cutting-knife, set diagonally across the front part of the bottom of the cart, it being arranged on two light flat springs, F F, so that it shall have elasticity up and down. The front or cutting edge of the knife should always be elevated slightly above its rear edge, so that the tendency of its movement shall always be upward when it is cutting, and thus insure the performance of the cutting operation with an upwardly-oblique cut.

G G H H are upper and lower side guides, extending forward of the cutter, and forming a channel for the corn to be collected and confined in just before the cutting operation is performed.

I I are curved arms projecting down from the top of the cart at the front end for the purpose of straightening up such stalks as may have been bent down, ready for the reel to take hold of them.

J is a vertical shaft arranged on one side of the machine. On the lower end of this shaft a sprocket-pinion, K, is arranged, so as to gear into a large sprocket-wheel, L, on the inner face of one of the propelling-wheels, as shown.

M is the main reel. It is arranged on the shaft J at a point just above the top edge of the side-boards of the cart. This reel serves for drawing in or bearing against the corn while the cutting is being performed.

N is the auxiliary reel. It is arranged above the main reel, and has its blades broad, convex, and spiral, so as to twist and force in the corn as fast as cut upon the platform. To increase the action of this reel I have arranged a light spring, O, on the convex side of each of the blades, so that a slight impetus shall be given to the stalks and their deposit onto the platform insured. The auxiliary and main reel are adjustable to suit different heights of corn by means of thimbles *a a* and set-screws *b b*, as shown.

P is the whiffletree to which the horse is attached. It is arranged on one side of the machine, as shown.

The operation is as follows: The team being attached to the whiffletree on one side of the machine, the machine is propelled forward, and in its progress the curved arms straighten up all corn lying across its path, the main reel gathers in and confines the corn within the channel formed by the guides G H, and the knife then cuts down the same by acting with an upwardly-oblique cut. The stalks cut down are twisted in by the spiral blades of the auxiliary reel and have an impetus imparted to them by the springs thereof, which causes them to fall regularly upon the platform. As soon as a load or bundle is cut down the foot-lever is operated and the same dumped.

What we claim as our invention, and desire to secure by Letters Patent, is—

1. Arranging the knife E on springs F, and with its cutting-edge slightly elevated above its rear edge, substantially as and for the purposes set forth.

2. The employment of an auxiliary adjustable reel, N, in combination with the main reel M, when the whole is constructed, arranged, and operates as and for the purposes described.

The above specification of our improvement in corn-harvesters signed by us this 16th day of August, 1858.

ISAAC REAMER.
HENRY MILLER.

Witnesses:
G. YORKE ATLEE,
R. W. FENWICK.